Sept. 2, 1969  J. E. VANDEGAER ET AL  3,464,926
PROCESS FOR ENCAPSULATION
Filed April 26, 1965  2 Sheets-Sheet 1

Inventors
Jan E. Vandegaer
Frank G. Meier
By Robert S. Dunham
Attorney

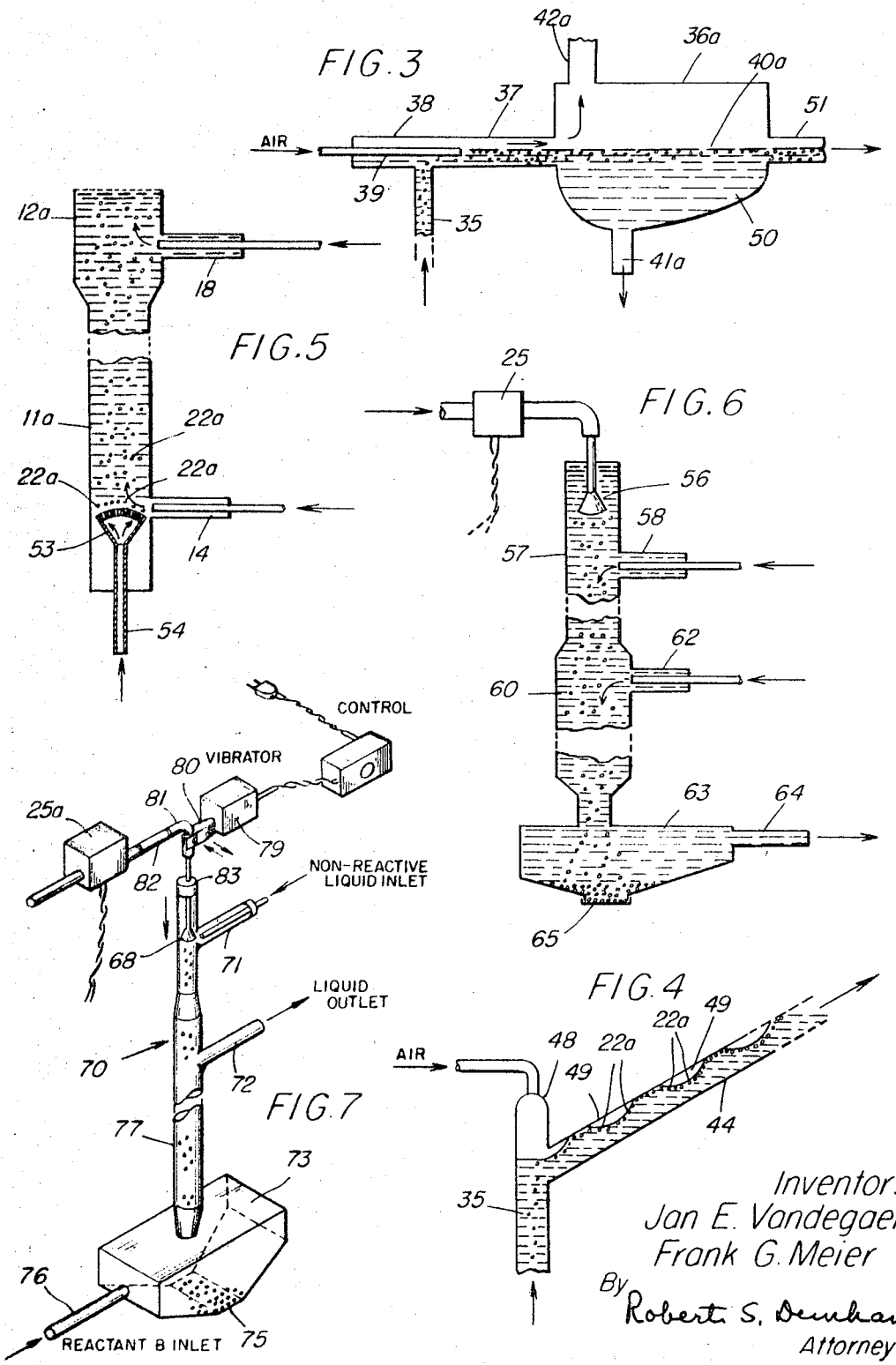

United States Patent Office 3,464,926
Patented Sept. 2, 1969

3,464,926
PROCESS FOR ENCAPSULATION
Jan E. Vandegaer, Wayne, and Frank G. Meier, Bloomfield, N.J., assignors to Pennwalt Corporation, a corporation of Pennsylvania
Filed Apr. 26, 1965, Ser. No. 450,812
Int. Cl. B01j 13/00; B44d 1/092
U.S. Cl. 252—316           11 Claims

ABSTRACT OF THE DISCLOSURE

In procedure for encapsulation by interfacial polycondensation between coacting intermediates respectively in immiscible liquids, droplets of one liquid which is to be encapsulated and which contains one intermediate are formed and released by injection in submerged relation at one end of a column of the second of the liquids. Such injection is effected in a portion of the second liquid which does not contain the other intermediate. The droplets advance along the column to a further portion of the second liquid, containing the second intermediate, where reaction of intermediates occurs to produce a skin of polycondensate around the droplets, the resulting capsules being collected and removed at the remote end of the column. Continuous operation involves continuing feed of the second liquid and of the second intermediate, for maintaining the described situation of the liquid portions, with corresponding continuous removal of liquid from the column.

---

This invention relates to encapsulation and particularly to the production of small or minute capsules constituted by a skin of polymeric composition enclosing a liquid droplet or other body of material. In a more specific sense, the invention is directed to improved procedure and apparatus for producing such capsules, in a continuous and effectively controlled manner, by interfacial condensation of a pair of complementary, direct-acting, polycondensates-forming intermediates in separate liquids which are substantially imiscible. In this mode of encapsulation, droplets of one of the liquids are established containing one of the intermediates, which then reacts, at the interface between the droplet and a body of the second liquid surrounding it, with the second intermediate as contained in the second liquid, such reaction forming the desired polymeric skin around the droplet and thereby producing a minute capsule containing the first liquid.

Certain procedures for encapsulation by interfacial condensation have been described in the pending patent application of one of the present applicants, Jan. E. Vandegaer, Ser. No. 330,255, filed Dec. 13, 1963, and now abandoned for Encapsulation, said application being abandoned, however, in favor of a continuation-in-part thereof, Ser. No. 710,293, filed Mar. 4, 1968. In that application, a large number of classes and examples of complementary, organic intermediates are disclosed as suitable for interfacial polycondensation, to produce capsule walls or skins of solid resin such as polyamide, polyester, polyurethane, polyurea, polysulfonamide, polycarbonate, or like substance. Liquids suitable for carrying the respective intermediates are likewise disclosed, being usually water and an organic solvent immiscible, therewith, it being understood that the droplets to be encapsulated may constitute either the aqueous phase or the oil phase. While in many cases the described interfacial reaction is primarily effected between difunctional intermediates, such as a diamine in water reacting with a diacid chloride in an organic liquid to yield a film or skin of linear polyamide, the cited application further discloses the use of trifunctional or other polyfunctional reactants as part or all of one intermediate (each intermediate being one compound or a mixture of a plurality of generally like-acting compounds), or indeed as at least part of both intermediates, to provide cross-linking between the polymer chains, for production of capsule walls of greater strength or other, controlled, special characteristics. Since all of the intermediates or other reactants, liquid media, reactions, and auxiliary chemical agents described in the cited application Ser. No. 330,255 are suitable for use in the present invention, the disclosure of said application is incorporated herein by reference, so as to avoid lengthy repetition of such description here.

It will be understood that capsules of this sort have a variety of uses, as for containing dyes, inks, chemical reagents, pharmaceuticals, flavoring materials, pesticides, herbicides, peroxides, and indeed anything which can be dissolved, suspended or otherwise constituted in or as a liquid enclosed by the capsule, and which, in such liquid or other form, is to be preserved until it is released by some agency that breaks, crushes, melts, dissolves or otherwise removes the capsule skin, or until release by diffusion is effected under suitable conditions. In many instances, it is desired that the encapsulated material be and remain in liquid form. On the other hand, while the encapsulation of the present invention is effected with respect to droplets of liquid, such liquid may, if desired, contain suspended solid particles, or may be such as to be converted, at a later time and within the capsule, partly or wholly into solid form (e.g., as by containing, beside the condensation-reacting intermediate, a substance subsequently polymerizable), so that the capsules may find ultimate use as containing, in effect, solid particles or substances.

In the above-cited application Ser. No. 330,255, an effective procedure there described and claimed comprises, in simplest form, taking the liquid to be encapsulated, with the appropriate intermediate carried therein, and dispersing it in a body of a second, immiscible liquid so as to produce a dispersion or emulsion of droplets of the first liquid in the second. Then the second of the condensate-forming intermediates is added, i.e., into the continuous phase constituted by the second liquid, and with further, limited agitation, the reaction occurs at the interfaces of the droplets and second liquid and yields discrete capsules which may be separated from the second liquid and which contain the first liquid with whatever further substance, e.g., dye, pharmaceutical, special reagent or the like, that may be desired to be preserved therein.

In accordance with the present invention, which is designed to provide an effectively continuous process and to afford improved control respecting the size and especially uniformity of size, as well as uniformity of wall or skin, of the capsules, droplets of one of the two immiscible liquids, containing one of the intermediates, are successively formed and released, as by appropriate injection, in submerged relation within a body of the other of the liquids, and are then caused to travel along a predetermined path in (i.e. through or with) that body to a remote locality, while a content of the second intermediate is maintained in the second liquid over at least a part of such a path, the intermediates thereby reacting at the interfaces of the droplets and the other liquid to produce the solidified polymeric skin, e.g. the desired polycondensate. This process forms droplets sequentially, and continuously transforms them into capsules which are readily collected or otherwise separated as discrete bodies after they have reached the end locality of the path.

A convenient way of carrying out the procedure involves providing the body of the second liquid as a moving column thereof, flowing along a substantially vertical path, the first liquid, to be encapsulated, being injected at such end of the path that the droplets will tend to travel by gravity or buoyancy to the other end, while the condensation reaction occurs to produce the desired capsule wall around each droplet. If the relation of the two liquids is such that the first is lighter, i.e. of lower density, the flow of the second liquid may be conveniently upward and the injection may be effected at the bottom of the column for corresponding upward travel of the droplets by force of buoyancy. Likewise if the first liquid is heavier, i.e. of greater density, a reverse mode of operation is usually appropriate, as by moving the liquid of the column continuously downward and injecting the droplets at a top or upward locality so that they fall by gravity while the reaction proceeds. In either case it is preferable that the rate of droplet or capsule travel be different from the velocity of the surrounding liquid, as to expedite or insure sufficient completion of reaction by contact of the droplet with successively different portions of the second, intermediate-containing liquid. Ordinarily in upward traveling circumstances, the respective densities of the liquids and the velocity of the second of them should be adjusted or selected so that the droplets rise faster than the liquid around them. Likewise in circumstances of descending travel, the same factors can be selected or adjusted to allow the capsules to fall faster than the downward speed of the liquid around them.

Thus more specifically, in one suitable mode of upward-traveling operation, the density of the liquid in the droplets, with its content of one intermediate, should be lower than the density of the second liquid, preferably considering the second liquid both of itself and as containing the other intermediate. Moreover the over-all or effective density of the encapsulated droplet should not be so changed by the formation of the skin of polymer as to modify adversely the desired movement of the capsule. Likewise in circumstances where the capsule is moved downward by gravity rather than upward by buoyancy, similar considerations may be taken into account, e.g. in a reverse way, to insure the desired fall of the droplets and resulting capsules. In most cases, of course, the direction of advance of the surrounding liquid is the same as the desired direction of travel of the droplets, so that there is a concomitant factor of the moving liquid tending to carry the droplet along; as explained, it is ordinarily preferable that the droplet, in upward or downward travel, move faster. Adjustments of density can be achieved by choice of the base liquid, i.e. the solvent, and particularly the organic (oil-type) liquid inasmuch as the other liquid is usually water. Suitable inert substances can be included in either liquid to modify the density, and likewise agents such as polymeric substances can be employed, as in the second (surrounding) liquid to increase its viscosity and thereby slow down the rate of droplet or capsule travel. Even more specifically, the capsules may travel counter-current in order to effect a more efficient use of the second reagent in the continuous phase.

In some cases, the capsules may be caused to travel in other than truly vertical direction, as for example by following an upwardly inclined path. Thus a desirable operation may involve moving a second liquid and the droplets under encapsulation along a sloping tube or conduit, while aiding the liquid travel by injection of air or other gaseous fluid, which may form successive large bubbles against the upper, inner surface of the surrounding tube. Under such circumstances, the capsules are moved to turn or rotate, as by rolling against such inner surface, under the influence of buoyancy and the modest turbulence of the defined conditions of travel. Such operation promotes uniformity of the polymerized capsule wall around the entirety of each capsule. It is also conceived that the flow of liquid and capsules may be entirely or partly horizontal, with like propulsion by injection of air or other gas, to move both the liquid and the capsules while the latter are rolled along and slightly agitated, it being appreciated that in circumstances of effecting or promoting liquid travel by air bubbles or slugs, the actual movement of the capsules may be slower than the liquid.

A further and particularly important feature of the invention in its specific aspects resides in the injection of the droplets of one intermediate-containing liquid into a body of the other liquid which is essentially inert, i.e., substantially free of the other intermediate. The droplets are caused to advance, e.g., upward or downward, through this section of inert liquid, and then as they pass into a further portion or length of liquid path (being still in submerged relation), the second intermediate is added to the surrounding liquid, as by feeding a stream of such liquid containing a suitable concentration of such intermediate. Preferably the first, inert portion of liquid is continuously advancing, in the direction of capsule travel, as by supplying at or near the region of droplet injection. With this mode of procedure, proper formation of droplets in discrete, controlled size, is assured before such droplets reach a locality where the condensation reaction begins to occur. Thereupon as the droplets continue on their path, through liquid that contains the second intermediate, the desired polymer is created at the droplet-liquid interfaces. By thus avoiding polycondensation immediately at the delivery tip of the injector, satisfactory droplet formation is greatly aided, as likewise the desired completion and uniformity of encapsulation, with minimization of any possible problems of coalescence among capsules.

In such operations where the droplet travels through successive portions of liquid, of which the first is essentially free of reactant, backward diffusion or intermingling of the reagent can be effectively avoided by the continuous introduction of the inert, surrounding liquid as at the vicinity of the injector, or even to the rear of it; the direction of liquid flow is thereby such that the introduced second intermediate is carried along, continuously, beyond its point of supply and thus in a direction away from the locality of droplet injection.

In forming the droplets, the first intermediate-containing liquid can be propelled to an injection tip or nozzle, submerged in the column of the second liquid, as under suitably valved on-off control whereby successive separate droplets are released. The injector element may have one or preferably a plurality of apertures, e.g., as of the nature of a spinneret such as employed for multi-filament injection in the production of synthetic fibers. Thus a multiplicity of droplets are released, to travel upward or downward as the flow of droplet-forming liquid is periodically initiated and interrupted by appropriate, small increments. As also indicated above, the procedure may be employed for either oil-in-water or water-in-oil encapsulation, e.g., to provide capsules where the enclosed liquid is aqueous, or is of an organic solvent, depending on the nature of the medium and its contents required to be enclosed in the capsules.

As will be apparent, the improved procedure of this invention affords a number of advantages in respect to control and effectiveness of encapsulation. A variety of sizes of capsules may be made, including relatively larger ones than are ordinarily obtainable by some other modes of encapsulation by interfacial condensation. Greater uniformity of capsule size is attainable, e.g., at any selected dimension, whether very minute or larger. The process permits essentially continuous production, and indeed the operation can be so considered even though eventual separation of the formed capsules from the surrounding liquid may be accomplished by batch-type manipulation, e.g., by removing successive batches of formed capsules from a receiving chamber at the remote end of the column. Because of extremely rapid conditions of skin formation, difficulties are lessened or avoided where some of the material to be encapsulated may happen to be soluble in the opposite phase or may happen to be reactive with one or more substances in or constituting the opposite phase. Experience also indicates that whereas in some other procedures careful handling may be needed for best results with water-in-oil encapsulation, this type of production is relatively easily accomplished in most cases with the present process. The improvements also extend to new features and combinations of apparatus, appropriate for encapsulating function, such being further described hereinbelow and shown in the drawings.

Referring to the drawings, which show, by way of example, certain embodiments of the apparatus and which illustrate some modes of carrying out the process:

FIG. 3 is a diagrammatic sectional view showing separation of formed capsules, appropriate for a system of the general type of FIG. 1;

FIG. 4 is a fragmentary, diagrammatic sectional view showing the movement of capsules in the device of FIG. 2;

FIG. 5 is a fragmentary, diagrammatic sectional view showing multiple droplet injection in an arrangement similar to FIG. 1;

FIG. 6 is a diagrammatic sectional view illustrating downward injection of droplets and of capsule travel; and FIG. 7 is a view, like FIG. 1, of a further modification.

Figures 1, 2:
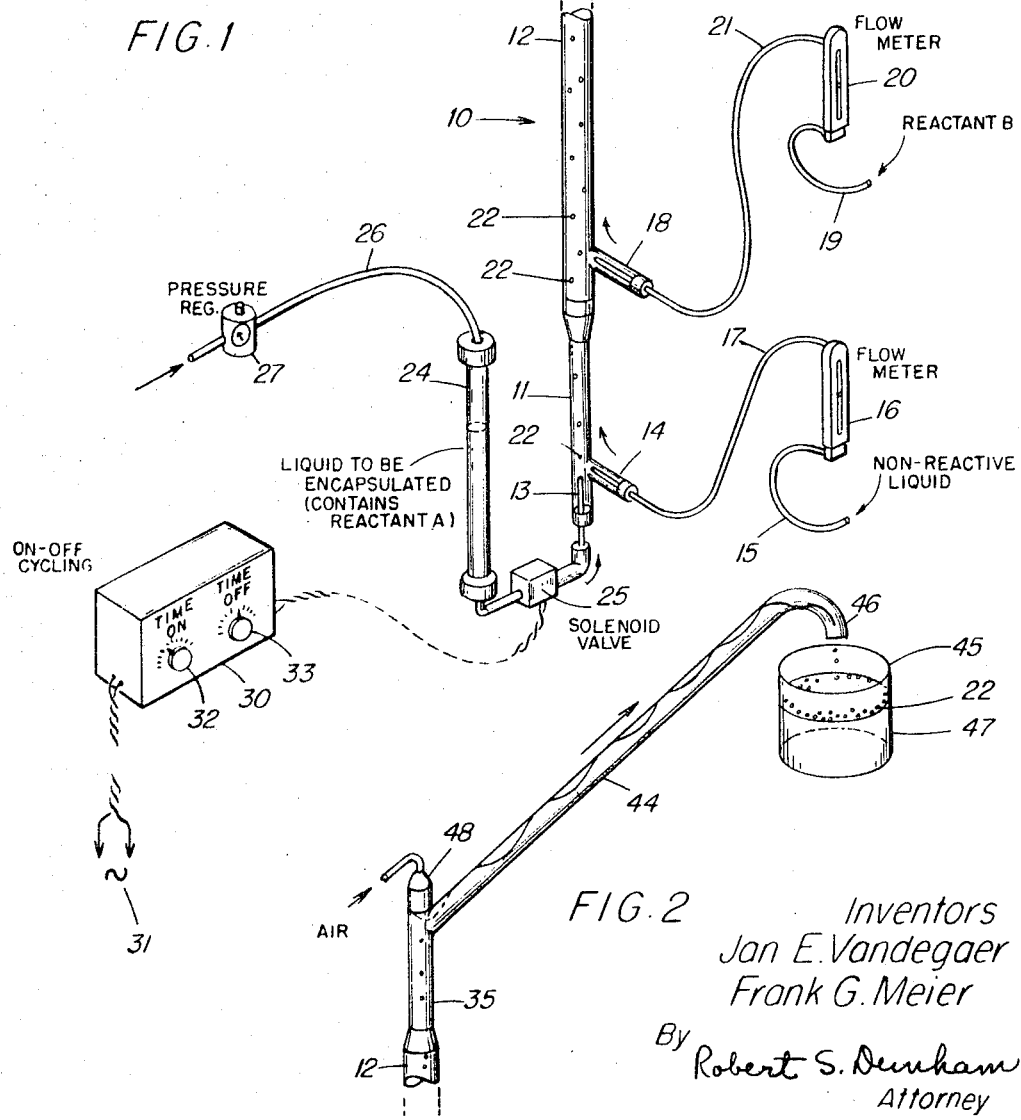
FIG. 1 is a simplified, schematic, perspective view of one system for continuously producing capsules, with upward vertical travel of the capsules and liquids.
FIG. 2 is a similar fragmentary view showing a modification of the system of FIG. 1, with respect to a mode of advancing the capsules.

As illustrated in FIG. 1, the apparatus includes a long vertical vessel 10 comprising a lower tubular section 11 which opens at its top into a further tubular portion 12, which may if desired be somewhat larger in horizontal cross-section, as shown, to provide for some additional liquid inlet, as explained below, and also to provide somewhat slower liquid travel. As will be apparent, the arrangement is designed to provide droplets, by injection through a nozzle or injector tip 13, in the lowermost part of the tube portion 11, of one of the two immiscible liquids, containing one of the intermediates, identified as reactant A, which will undergo reaction with the other intermediate, reactant B, to produce the capsule wall. At a convenient locality in the vicinity of the injector 13, appropriate inlet means 14, such as an injector tube in a tubular housing, provide for feed of the other immiscible liquid, preferably (as indicated) free of the other reactant at this point. Such liquid is appropriately advanced (as by gravity or pumping means, not shown) in a continuous fashion through tubing 15, flowmeter 16 and further tubing 17 to the inlet 14.

At a locality spaced remotely from the locality of injection and of inlet for reactive liquid, the other intermediate, i.e. reactant B, is fed into the rising liquid in the column 10, e.g. by an inlet 18, similar to the inlet 14. Conveniently, reactant B, carried in a further, minor quantity of the same liquid as supplied at inlet 14, is advanced through tubing 19, flowmeter 20 and further tubing 21, in a continuous fashion, to the inlet 18, where such reactant-containing liquid mixes into the rising fluid in the column portion 12. Most conveniently, this inlet 18 is located adjacent the lower end of the portion 12, so that as the droplets 22 rise from the injector 13 and travel upward, the desired interfacial reaction can occur, to the extent necessary and desired throughout the entire path in the portion of rising liquid in the vessel section 12.

Appropriate incremental delivery of the first of the liquids, containing reactant A, to the injector 13, is provided so as to deliver the minute droplets 22, successively at the tip of the injector. Thus the system may include an upright, tubular vessel 24 containing a supply of this liquid and communicating at its bottom through a solenoid valve 25 with the injector 13. Advance of the liquid from the vessel to the injector during momentary openings of the valve 25 can be effected in various ways, as by gravity, or more conveniently under air pressure furnished through a conduit 26 into the closed top of the vessel 24, the pressure of such supplied air being regulated at a desired value by a conventional pressure regulator 27 in the line 26.

The actual release of the droplets is conveniently effected, as indicated, by opening and interrupting supply of the liquid to the injector, as at the solenoid valve 25. Suitable automatic means may be employed, indicated as an electrical on-off cycling unit 30, which may be of a conventional type, designed to deliver energizing signals to a device such as valve 25, each of controlled duration and separated by controlled intervals of time. Thus the cycling device 30, which may be energized from the usual electric current supply 31, may have means indicated at 32 for adjusting the time when the current is turned on, so to speak, to the valve and similar adjustment indicated at 33 for the time when the current is off, such intervals being respectively the open interval of the valve and the closed interval, and thus governing the magnitude of the droplets and the rate of their release at the injector, i.e. in that the liquid from the vessel 24 only flows when the valve 25 is open.

As will be apparent, the liquid delivered by the inlets 14 and 18 rises through the column 10, while the droplets similarly rise and the condensation reaction occurs (with the droplets and resulting capsules preferably rising at a faster rate than the liquid), for corresponding delivery of completed capsules at the upper end section 35 of the vessel. One mode of recovering the capsules is shown in FIG. 1, and can be carried out by aid of a spherical or similar receiver 36 communicating with the upper end of the column section 35 by a horizontal branch tube 37, which may have a rearward portion 38 to enclose an inlet tube 39 for air under moderate pressure, that aids in moving the capsules along into the receiving vessel 36, i.e. together with the surrounding liquid that can be maintained to a level 40, corresponding to a mid-region of the tube 37. The formed capsules are thus gently collected as they float at or near the surface 40 of the liquid in the vessel 36, while liquid is continuously discharged, free of capsules, through a lower outlet 41, and air is exhausted through an upper outlet 42. The vessel 36 can be conveniently opened (as by means not shown), or removed, from time to time, for collection and separation of the capsules, constituting the desired product.

Assuming, for example, that it is desired to effect oil-in-water encapsulation, as to provide capsules containing a quantity of dye or other color in an organic liquid, having in mind the use of such capsules for an ink or transfer medium, a supply of the oil-type liquid containing reactant A is provided in the vessel 24. Thus for instance, this liquid may be mineral oil having in solution a quantity of a diacid chloride, such as sebacoyl chloride, and containing the desired agent for enclosure in the capsule, e.g. a red, blue or other colored dye. In such instance, the other liquid, immiscible with the first, may be water, supplied through the inlet 14 in appropriate quantity, while reactant B, in a relatively concentrated water solution is supplied through the inlet 18. Thus as a further instance, reactant B may be a diamine, such as hexamethylenediamine. If desired, as to increase the density of the aqueous liquid in the column 10, and also to facilitate the reaction in known manner, other substances may be incorporated into one or both of the liquid supplies at the inlets 14 and 18, e.g. including alkaline material, such as sodium carbonate, and also substances such as sodium chloride. Thus, rather than plain water, the liquid supplied to inlet 14 may be a 20% aqueous sodium chloride solution.

With suitable air pressure delivered to the head of the vessel 24 and the solenoid valve operated at a selected rate and duration of open interval, droplets of the oil-phase liquid are successively released by the injector 13, submerged in the surrounding upwardly flowing aqueous liquid, which fills the entire column 10, primarily by continuous supply at inlet 14. These droplets, released at intervals ranging from a small fraction of a second to one or two seconds, may be of desired size, controlled by adjustment of element 32 of the cycling mechanism and the setting of the air pressure 27, for capsule sizes for instance from $10^{-12}$ to 10 ml. It will be apparent that the inner diameter of the orifice (or of each orifice) of the injector should be related to the intended causule size; with simple tests it is readily possible, for a given capsule size, to avoid an orifice so small the the releasing droplet may tend to break up in a stream of smaller ones or so large that a droplet may not be released at the desired time but later when the volume of liquid at the injector tip has grown to a bigger size. In general the ratio of capsule diameter to injector orifice diameter can range from 1:1 to 25:1, for corresponding selection of a convenient orifice diameter to produce a desired size of capsule. Vibration of the injector or the liquid surrounding it is helpful but not mandatory for the reproducible formation of droplets.

The droplets, preferably having a significantly lower density than the aqueous liquid, rise through the portion 11 and into the portion 12, where the surrounding liquid is augmented by the supply of reactant-containing liquid through inlet 18. The interfacial condensation reaction occurs at the surfaces of the droplets, and progressively continues as the latter rise, preferably somewhat faster than the upward flowing liquid, in the section 12 which is relatively much longer than the section 11.

Aided by air propulsion through the tube 39, the droplets are ultimately swept from the top section 35 into the receiver 36, where they collect and can be removed, washed and dried for desired use. The aqueous liquid, containing any remainder of reagent B, is discharged through the outlet 41, and if desired, may be utilized, in part, for making up additional supply of concentrated reactant B solution for the tube 19. Alternatively, if the aqueous liquid has only a very low residual content of reactant B, it may be employed, directly or in part, to constitute the essentially nonreactive liquid fed to the pipe 15 or inlet at 14. As will be seen, the process thus affords continuous production of the desired small capsules, having e.g. a polyamide (nylon-type) skin. The capsules may have any desired size within a wide range, and by virtue of the described procedure, have a remarkably uniformity of the selected size.

As explained, other modes of travel of the droplets during encapsulation, and of the surrounding liquid, may be employed. Thus for instance, in FIG. 2 the upper end 35 of the column portion 12, which may itself be relatively much shorter than in FIG. 1, leads to an elongated, upwardly sloping tubular section 44, where the liquid may further travel, to a suitable discharge locality, illustrated simply as affording an open vessel 45 into which the stream of liquid and capsules falls from a downwardly turned spout 46 at the upper end of section 44. The capsules 22 will collect at or near the surface of the liquid 47 in the vessel 45.

In aid of the travel of the capsules, and particularly to provide a mild or moderate agitation of them, air under modest pressure is supplied through an inlet 48 just above the connection of the sloping tube 44 with the top locality 35 of the tube 12. Referring further to FIG. 4 it will be seen that under appropriate control, the air travels upward in the tube 44 as large bubbles or slugs 49, while the capsules rise against the upper, inner surface of the tube. Their movement along such surface tends to give them a rolling or turning motion, which is increased or aided by the agitation of the air bubbles 49. In this way the capsules during formation are caused to present all their faces, so to speak, in succession as they advance, and correspondingly the skin building up by polymerization around each droplet is highly uniform on all such faces. In other words, with this or similar mild agitation, uniformity of capsule wall formation around the droplet is assured. While direct upward movement alone, as in FIG. 1, can yield highly satisfactory capsules, there may in some cases be a tendency toward thicker skin structure at the top or forward face of each capsule, because of more reactive conditions, if the capsule does not turn or rotate as it travels. Although some uses of the capsules may find advantage in non-uniformity of skin around the droplet, operations such as shown in FIGS. 2 and 4 will promote uniformity.

FIG. 3 illustrates one way of continuously collecting and separating the formed capsules, as with the system generally shown at the top of FIG. 1. Here the capsules carried along (with the liquid) through the tube section 37 with the aid of air from the injector 39, are maintained at or near the surface of the liquid 50 in a vessel 36a. Opposite the inlet, the vessel 36a may have means for skimming off the collected capsules, such means being here shown as an outlet 51 located immediately adjacent the level 40a of the liquid 50. The major part of the liquid, or nearly all of it, is continuously discharged through a bottom outlet 41a, while the vessel 36a has a corresponding air vent 42a at the top.

Whereas for simplicity of illustration, FIG. 1 shows an injector 13 releasing one droplet at a time, FIG. 5 illustrates release of a multiplicity of droplets at each increment of flow of the liquid to be encapsulated. Thus in FIG. 5 the lower, tubular vessel portion 11a accommodates a spinneret-type nozzle 53 at its lowermost region, whereby each increment or slug of liquid (containing reactant A) supplied at the neck 54 of the nozzle 53, causes discharge, essentially simultaneously, of many discrete droplets 22a. These droplets then rise in the upwardly traveling liquid in the column section 11a, such liquid entering through the inlet 14, and eventually continue their travel up in the further column section 12a, where the interfacial reaction occurs and progresses by virtue of the second reactant supplied through inlet 18. Other coopeartive steps and devices may be provided as in the other figures, e.g. for supply and control of the liquids and for ultimate collection and separation of the formed capsules.

In FIG. 6, arrangements are shown for a procedure wherein the droplets and liquid move downwardly, as by virtue of the capsules having a substantially higher density than the surrounding liquid. Thus in FIG. 6, the liquid to be encapsulated, with reactant A, is supplied incrementally by the solenoid valve 25, through a downwardly turned spray nozzle or spinneret 56, in submerged relation at the head of column section 57, corresponding to section 11, which has an inlet 58 for non-reactive liquid. The liquid and droplets continue to move downwardly, with the droplets preferably falling through the liquid, into the lower and greatly elongated section 60, where reactant B (and a further quantity of the second liquid) is added at the inlet 62. The formed capsules eventually collect in a closed receiving vessel 63, e.g. falling to the bottom thereof, while the liquid itself is discharged at an upper outlet 64. The vessel 63 may have removable bottom structure 65 or other means for periodically or continuously extracting the formed capsules. Again, it will be understood that appropriate means are provided, as in FIG. 1, for supplying the first liquid to the injector 56 and for controlling such supply at the valve 25.

In all the above illustrated operations it will be noted that the droplets are first formed in non-reactive liquid, thus assuring their discrete and complete formation, without premature skin or polymer-forming reaction. Then as they reach the further portion 12, 12a or 60 of the elongated vessel, the incoming reactant B, being mixed into the liquid body, effectuates the desired condensation-type reaction, so that the capsules are formed. Particularly by virtue of the flow of the non-reactive portion of liquid continuously along the droplet path from the injector locality to the locality of reagent addition, backward diffusion of the reagent is effectively prevented. Hence by these operations, proper droplet formation is assured and thereafter essentially rapid and continuous capsuleskin production, for ultimate delivery at the remote locality, of the desired product.

FIG. 7 illustrates a further mode of carrying out the invention, omitting certain liquid-supply and other auxiliary parts, which may be as shown in FIG. 1. Here the injected droplets travel in counter-current relation to the flow of liquid containing the second reactant. In the specific system of FIG. 7 the droplets descend and the reactant-containing liquid flows upwardly, but it will be understood that a reverse arrangement may be used in appropriate circumstances. As shown, the liquid to be encapsulated is incrementally supplied through the solenoid valve 25a, and droplets of such liquid, containing the first reactant, are correspondingly released, individually or in groups, by the injector 68 within the upper part of the column 70. The droplets are thus submerged in a body of non-reactive liquid (immiscible with the liquid of the droplets) and move downward threin, preferably in a flow of such liquid which enters via the inlet 71 adjacent the injector 68 and may leave the tube or column 70 at an intermediate side outlet 72.

At the foot of the column 70 a chamber 73 is provided, for collection of completed capsules and removal at the botom 75 thereof as with the chamber 63 of FIG. 6, but provided with an inlet 76 through which liquid containing the second reactant is continuously introduced, to flow upward in the main portion 77 of the tube 70, countercurrent to the descending droplets or capsules, and to discharge through the outlet 72 along with the first portion or flow of liquid coming from inlet 71. Withdrawal of both flows at 72 inhibits any tendency of either liquid to diffuse significantly into the other above or below this locality in the tube 70. The desired condensation reaction occurs at the interface of the droplets and the liquid in the tube section 77, between the intermediates respectively contained in the liquid supplied through injector 25a and the last-mentioned liquid, to create the capsule walls; the countercurrent relation may thus promote the thoroughness or extent of reaction or effectuate its completion in a shorter length of the tube section 77.

As will be understood, the relative densities of the several liquids or liquid portions introduced (at 68, 71 and 76) are selected or adjusted to provide the described movement of the droplets and capsules, e.g. their descent, in the flowing portions of liquid. The liquid introduced through the inlet 76, of course, is constituted, as in proportion of reactant to solvent, to constitute the complete continuous phase medium in which the capsule-skin-forming reaction occurs. Indeed, the substantially non-reactive liquid supplied through inlet 71 may conceivably be of different composition (although still immiscible with the liquid of the droplets) from the non-reactive vehicle of the flowing portion in tube section 77, although it is preferably the same as the latter and in general should at least be miscible with the latter. In all cases, however, the entire quantity of liquid in the column 70 can be properly defined or considered as a body of a second liquid immiscible with the first liquid of which the injected droplets are constituted, in the sense of certain basic aspects of the process, i.e. respecting the injection of droplets of a first liquid containing one intermediate into a body of a second liquid immiscible with the first, and causing such droplets to travel through a portion of such second liquid which contains the second intermediate.

The system of FIG. 7 also has provision for vibrating the injector 68 to promote uniformity of droplet formation and release, it being understood that similar means may be employed, for the same purpose, in other embodiments of the invention, e.g. for the injectors 13, 53 and 56. Thus in FIG. 7, an electromechanical vibrator 79, which may be a conventional device, has a driven, vibrating arm 80 clamped or coupled to an external part of the injector assembly such as the portion 81 of the liquid supply tube. The injector assembly may be mechanically displaceable for vibration as by resilient or otherwise flexible supporting parts, e.g. tube section 82 leading to the section 81, and a collar 83 mounting the injector in the top of the column 70. The vibrator 79 may have suitable electrical power supply, as through a conventional control means 84 for adjusting the amplitude of vibration, so as to vibrate the injector continuously at a suitable frequency, such as 60 cycles per second or an appropriate proportion or multiple thereof.

With vibration imparted to the emerging droplets as by vibrating the injector element or the liquid in its vicinity, reproducibility of droplet formation and therefore of capsule spacing and size may be enhanced in many cases, for instance where it may be difficult to release very small droplets with regularity, or where accidental or other random mechanical shocks may affect uniformity of droplets, such shocks being then in effect masked by the applied vibration.

By way of more specific example, one embodiment of apparatus according to FIG. 1 comprised a main tubular section 12 about 115 cm. long, having an inside diameter of 36 mm., connected to a lower tubular section 11, 20 cm. long, having an inside diameter of 20 mm. These and some other parts (such as the take-off flask 36) were made of glass, although other transparent material could be employed, or indeed any material or combination of materials, whether wholly opaque or provided with sight areas, as appropriate to contain the liquids involved. Liquids were supplied to inlets 14 and 18 through conventional variable-area flowmeters 16 and 20, with the inlets arranged as shown, inlet 18 being disposed about 42 cm. above the injector 13. The injector itself was a simple glass pipette tip having a nozzle opening of about 0.3 mm. diameter, the system also including, if desired, a check valve (not shown) between the solenoid valve 25 and the injector. In a number of successful operations with the system of FIGS. 2 and 4, the inclined tube 44 at the top of the column 12, wherein successive air pockets 49 moved the capsules along, was 70 cm. long, having an inside diameter of 20 mm.

In one set of operations with an arrangement having essential elements as in FIG. 1, the solution to be encapsulated (omitting dye or other substance for ultimate use, which can be included to the extent desired) had the following composition:

| | |
|---|---:|
| Toluene _____ml__ | 200 |
| Sebacoyl chloride _____g__ | 13 |
| Azelaoyl chloride _____g__ | 37 |
| Trimesoyl trichloride _____g__ | 12 |

This solution, an oil-type liquid to be formed as droplets in water, was maintained in vessel 24, under an air pressure of about 20 pounds per square inch, gauge, for supply under solenoid valve 25 control to the injector 13. The non-reactive liquid furnished through inlet 14 was distilled water, and the complementary reactant introduced through inlet 18 was supplied as a solution having the following composition:

| | |
|---|---:|
| Distilled water _____ml__ | 2000 |
| Diethylenetriamine _____g__ | 200 |
| Sodium carbonate monohydrate _____g__ | 50 |

The operation was commenced (in FIG. 1 apparatus dimensioned as above) with the non-reactive liquid (water) supplied through inlet 14 at about 40 ml. per minute, which was increased, as a succession of droplets began to be developed, to 50 ml./min. The amine solution was introduced through inlet 18 at about 30 ml./min. For tests and examination purposes, the operation was run with release of about one droplet every two seconds at the injection tip 13, producing fully satisfactory capsules at the same rate, which were collected in the receiver 36.

Under identical conditions of liquid composition and supply rates, the system of FIGS. 2 and 4 was likewise utilized with effective results in capsule production. As indicated above, considerably more rapid rates of droplet release and corresponding encapsulation are attainable, and indeed much larger production can be achieved with multiple injection such as indicated in FIG. 5.

In some operations, the column liquid, e.g. as introduced at inlet 14, also contained an appropriate quantity of a thickening agent such as methyl cellulose, which served to increase the viscosity of the liquid throughout the column. This lessened any tendency of the amine solution (reactant B) to flow or diffuse downward, and there was also a retardation of the upward rise of the capsules, thus increasing capsule strength by reason of longer contact time.

As will be noted, reagent A consisted of two diacid chlorides and also a trifunctional ingredient, trimesoyl trichloride, so that upon interfacial condensation with the amine reactant B, the resulting polymer skin included cross-linking for greater strength of the capsule wall. The produced polymer was of the polyamide (nylon) type. The produced capsules were all fairly close to a size of 3 mm. diameter, but this size could be changed over a very large range by varying the open time of the valve indicated at 25 and the pressure at 27.

Other instances of formulations suitable for producing capsules in accordance with the present procedures are as follows:

For oil-in-water encapsulation, with upward injection (as in FIG. 1) the solution to be encapsulated comprises 7.5 g. sebacoyl chloride in 100 ml. mineral oil. This was injected into a column of non-reactive liquid consisting of a 20% aqueous sodium chloride solution, the second reactant being hexamethylenediamine supplied in aqueous solution, such that the reactive part of the column contained this reactant in the proportion of 20 g. to about 400 ml. of water. Droplets and the resulting capsules of the first solution travel upwardly in the second solution, for the production of such capsules.

As an example of water-in-oil encapsulation, with the liquid containing reactant A injected upwardly, the following solutions were used:

The injected aqueous solution consisted of:

| | | |
|---|---|---|
| Hexamethylenediamine | g-- | 10 |
| Diethylenetriamine | ml-- | 2 |
| Distilled water | ml-- | 100 |

The surrounding solution, in which the droplets and forming capsules of the first solution moved upwardly, consisted of 7.2 g. of sebacoyl chloride in 500 ml. of chloroform, the injection being made into a first portion of inert organic liquid free of second reactant. The last-mentioned liquid in this case being 50 ml. of carbon tetrachloride, it being heavier than chloroform prevented back diffusion of the second reactant. The desired discrete capsules were collected at the top of the column.

In an instance of oil-in-water encapsulation, to be carried out by downward injection and downward travel of the droplets, the following is employed:

The solution to be injected consisted of:

| | | |
|---|---|---|
| Sebacoyl chloride | g-- | 7.2 |
| Carbon tetrachloride | ml-- | 100 |
| Oil red dye | g-- | 0.2 |

The surrounding solution, into which droplets of the first selection are injected for travel downwardly, consisted of:

| | | |
|---|---|---|
| Hexamethylenediamine | g-- | 10 |
| Diethylenetriamine | ml-- | 2 |
| Sodium carbonate | g-- | 8 |
| Distilled water | ml-- | 250 |

If desired, the injection can be effected in submerged position in a body of plain distilled water, so that the capsules travel into a further downward path, which is made to have the above composition. The resulting capsules are collected at the foot of the column.

Another instance of encapsulation by downward injection, specifically of the water-in-oil type, involves the following solution to be encapsulated:

| | | |
|---|---|---|
| Hexamethylenediamine | g-- | 10 |
| Diethylenetriamine | ml-- | 2 |
| Distilled water, containing a water soluble green dye | ml-- | 100 |

This solution is introduced in submerged condition so as to provide droplets which travel downwardly in a second reactant-containing solution consisting of 7.2 g. sebacoyl chloride in 250 ml. of mineral oil. Although for some purposes in these examples the droplets can be injected directly within the solution of reactant B, it is of special advantage, as explained, to form and release the droplets in an inert fluid, e.g. the organic liquid, for subsequent travel into the reactant-containing solution. As in the previous example, the encapsulated droplets are collected at the foot of the column.

While in various instances noted above the capsule walls consisted of polyamide, the procedures are equally applicable to the production of other polymers of the stated character, by interfacial reaction of the condensation type, between direct-acting intermediates. As also explained, reference may be had to the aforesaid pending application for more complete characterization and extensive exemplification of intermediates that can be employed.

Merely for present illustration of such polycondensation reactions, the following summary of examples is given here, all of these being intended to be considered as affording or constituting such reactions:

Diamines or polyamines in the water phase and diacid or polyacid chlorides in the organic phase yield capsule walls consisting of polyamides, conveniently sometimes described herein as nylon or nylons. Diamines or polyamines in the aqueous liquid and bischloroformates or polychloroformates in the organic liquid afford a polyurethane capsule skin. Again, diamines or polyamines in water and disulfonyl or polysulfonyl chlorides in the organic solvent produce a polysulfonamide skin. Likewise with diamines or polyamines in the aqueous phase, a polyurea capsule wall is obtainable when the organic phase contains phosgene (chloroformyl chloride), which for convenience of classification herein may be considered to have the properties of a difunctional acid chloride, i.e. corresponding to diacid chlorides such as sebacoyl chloride. Also, diamines or polyamines in water and diisocyanates or polyisocyanates in the organic solvents produce a polyurea skin.

In summary, the present procedure affords effective encapsulation of aqueous or oil-type liquids, which may contain any of a wide variety of substances (such as dyes, pharmaceuticals, flavors, pesticides and others, readily added to the first liquid in any of the above examples), such encapsulation being easily controlled to a desired capsule size, being operable for continuous production and being suited to many special situations, e.g., as indicated, where difficulty may be encountered with other modes of operation.

It is to be understood that the invention is not limited to the specific embodiments and compositions herein shown and described but may be carried out in other ways without departure from its spirit.

We claim:

1. A process of encapsulation by interfacial condensation of a pair of complementary, direct-acting, polycondensate-forming intermediates in separate liquids which are substantially immiscible, said polycondensate being selected from the group consisting of polyamide, polyester, polyurethane, polyurea, polysulfonamide and polycarbonate, comprising: forming and releasing discrete droplets of a first of said liquids, which contains one of the intermediates, by injection discharge of said first liquid through orifice means in submerged relation at one locality in a first portion of a second of the liquids, including controlling said injection discharge to provide release of said first liquid from said orifice means as said discrete droplets of substantially uniform, predetermined size; causing said droplets to travel along a predetermined path in said first portion of said second liquid, said first portion being essentially non-reactive so that said droplets are first established and released into, and travel through, non-reactive liquid without forming an encapsulating skin on the droplets; and causing said droplets to travel along a continuation of said predetermined path in a second portion of the second liquid, which contains the second of intermediates with each other by polycondensation at the interfaces of the droplets and the second liquid for encapsulating the droplets with a skin of polycondensate produced by said reaction, so that said droplets become encapsulated with said skin only after they have traveled into the second portion of the second liquid.

2. A process as defined in claim 1, which includes continuously feeding further quantities of said second liquid containing the second of the intermediates into said second liquid portion at a place thereof adjacent the first liquid portion, while flowing the liquid of said second portion continuously from said place to the said second locality, so that the content of said second intermediate in said second liquid portion is maintained.

3. A process as defined in claim 1, which includes supplying second liquid into said first non-reactive portion and flowing the liquid from said first portion into the second portion and toward the second locality while continuously feeding said second intermediate into said second portion to maintain its content of said second intermediate, so that the successive portions comprise liquid traveling substantially continuously toward the second locality.

4. A process as defined in claim 3, wherein said successive portions of liquid are arranged vertically with the second-intermediate-containing portion above the first, non-reactive portion, the continuous supply of the second liquid and the feed of the second intermediate effecting continuous liquid travel upward to the second locality, and wherein the first intermediate-containing liquid and the encapsulated droplets thereof have substantially lower density than the second liquid and then said second liquid containing said second intermediate, for travel of the droplets upward through the successive portions of moving liquid, by force of buoyancy, faster than the speed of upward travel of liquid in said portions.

5. A process as defined in claim 3, in which the operation and control of said injection discharge for said formation and release of droplets comprises supplying successive, discrete quantities, of controlled magnitude, of said first intermediate-containing liquid to and through said orifice means.

6. A process as defined in claim 3, in which the aforesaid predetermined path extends upward, and which includes moving the liquid of said successive portions continuously upward for effecting the aforesaid continuous travel of the second liquid to said second locality, said droplets and the resulting capsules thereof having a density less than said liquid as containing the second intermediate, to provide force of buoyancy on the said droplets and capsules thereof; and advancing said capsules and said liquid of said second portion beyond said second locality with said capsules floating on said last-mentioned advanced liquid, and separating said capsules while withdrawing liquid from beneath them.

7. A process as defined in claim 6, in which at least part of said predetermined path in the second portion of said second liquid extends in an upwardly sloping direction, said step of causing the droplets to travel along said path including advancing the droplets along beneath an upper, sloping, liquid-confining surface, at said part of the path, for promoting turning movement of the droplets while the reaction is progressing.

8. A process as defined in claim 7, which includes supplying gaseous fluid into said last-mentioned part of the path to provide advance of successive bubbles upward along said surface to effectuate the aforesaid advance of the droplets therealong.

9. A process as defined in claim 3, in which the aforesaid predetermined path extends downward, and which includes moving the liquid of said successive portions continuously downward for effecting the aforesaid continuous travel of the second liquid to said second locality, said droplets and the resulting capsules thereof having a density greater than said liquid as containing the second intermediate, to provide downward force of gravity on said droplets and capsules thereof relative to said liquid as last mentioned.

10. A process as defined in claim 1, in which said first and second portions of second liquid meet at a third locality intermediate the first and second localities, and which includes continuously supplying essentially non-reactive second liquid to the first locality and thereby continuously flowing said non-reactive second liquid along said path to said third locality co-currently with the travel of the droplets, continuously supplying second liquid containing the second of the intermediates to the second locality and thereby continuously flowing said second intermediate-containing liquid, as the aforesaid second portion, along said path to said third locality countercurrently to the travel of the droplets, and continuously discharging all of the flowing second liquid at said third locality.

11. A process as defined in claim 1, in which the operation and control of said injection discharge for said formation and release of droplets includes vibrating said orifice means as said first liquid is discharged therethrough, to promote uniformity in production of said droplets.

References Cited

UNITED STATES PATENTS

| | | | |
|---|---|---|---|
| 2,492,861 | 12/1949 | Gunnell | 264—4 |
| 2,648,609 | 8/1943 | Wurster | 117—100 X |
| 3,270,100 | 8/1966 | Jolkovski et al. | 252—316 X |

RICHARD D. LOVERING, Primary Examiner

U.S. Cl. X.R.

18—25; 264—4; 117—100; 99—140, 166; 424—32; 106—19

5837-RSD

PO-1050
(5/69)

UNITED STATES PATENT OFFICE
CERTIFICATE OF CORRECTION

Patent No. 3,464,926          Dated September 2, 1969

Inventor(s) JAN E. VANDEGAER and FRANK G. MEIER

It is certified that error appears in the above-identified patent and that said Letters Patent are hereby corrected as shown below:

Column 2, line 6, after "or" insert --of--. Column 7, line 7, for "causule" read --capsule--; line 9, for "the" [first occurrence] read --that--; line 44, for "remarkably" read --remarkable--. Column 13, line 16, after "intermediates" insert --, to a second locality, while reacting said intermediates--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents